Dec. 14, 1937.  A. O. AUSTIN  2,102,232
UNIFORM ARC, COMPENSATING CHORD CONDUCTOR SUPPORT WITH RESILIENT GRIP HEADS
Filed Feb. 3, 1934  5 Sheets-Sheet 3

INVENTOR
Arthur O. Austin

INVENTOR
Arthur O. Austin

Patented Dec. 14, 1937

2,102,232

UNITED STATES PATENT OFFICE 2,102,232

UNIFORM ARC, COMPENSATING CHORD CONDUCTOR SUPPORT WITH RESILIENT GRIP HEADS

Arthur O. Austin, near Barberton, Ohio

Application February 3, 1934, Serial No. 709,609

30 Claims. (Cl. 248—63)

This invention relates to improvements in clamps for attaching high voltage conductors to suspension insulators or dead end insulator strings, or for similar uses.

The invention has for one of its objects the provisions of a clamp which will permit a long radius of curvature in the conductor when it is held either at suspension or dead end positions.

A further object is to provide a clamp which will permit of a wide range in the angle of sag.

A further object is to provide a clamp which will shield the conductor.

A further object is to provide a clamp which will automatically tighten before permitting slip.

A further object is to provide a clamp in which the members in contact with the conductor will not move when the clamp automatically tightens to increase its grip upon the conductor.

Another object is to provide a clamp which will readily develop the tension in the cable and have light weight.

Another object is to provide a clamp which will increase the electrostatic field and improve the voltage gradient for the insulator string.

Another object is to provide a clamp in which a large movement of the outer end of the clamp will produce little or no movement in the conductor at the center of the clamp.

A further object is to provide a clamp which may be readily and cheaply manufactured.

A further object is to provide a clamp which will relieve the stress upon the conductor at the point of maximum bending or flexure.

Another object is to provide a clamp in which the conductor can be gripped at some distance from the point of attachment of the clamp to its support without requiring a clamp of heavy mass.

Another object is to provide a clamp in which any reduction in the size of the conductor due to overload may be compensated for by the automatic takeup in the clamp.

Another object is to provide a construction in which the relative grip between conductor and seat pieces and the attaching means may be controlled.

Another object is to provide a construction which will permit of the dampening of vibrations or oscillations.

Another object is to provide a clamp in which the reflections due to vibrations or oscillations will be materially reduced.

Another object is to provide a construction which will produce dampening due to longitudinal as well as vertical movement of the conductor.

Another object is to provide a clamp in which the grip upon the conductor may be graded.

Another object is to provide a support thru a long distance along the conductor without introducing heavy bending moments in the clamp members.

Other objects and advantages will appear from the following description.

The invention is exemplified by the combination and arrangement of parts shown in the accompanying drawings and described in the following specifications, and it is more particularly pointed out in the appended claims.

The mechanical and electrical characteristics of the clamps used for attaching conductors to suspension or dead end insulator strings have much to do with the cost and reliability of an electrical transmission line. The stresses are likely to be intensified in the conductor at the point of support thereby limiting the tension in the conductor or shortening its life due to crystallization or fatigue. By regulating the grip in the clamp it is possible to take up heavy tensions in the conductor at points where desired, permitting the use of lighter structures and insulators at intermediate points.

As the working tensions and size of conductors increase the problem of gripping or supporting the conductor becomes a more important factor in the cost and mechanics of the line. More favorable conditions for the conductor permit of higher working tensions, which reduce the number of supports required or permit of a lower effective height for the line. The stress in some of the members of conductors of large diameter increases very materially as the radius of curvature is decreased. Where the radius of curvature changes materially, fatigue in the material is likely to take place in a relatively short time.

As clamps supporting the conductors are located at towers or supports where the electrostatic field is intensified by the presence of the supporting structure and insulator strings it is important to provide a clamp which will permit of high voltage without causing a brush or corona discharge, producing radio interference or inducing flashover of the insulator string at a low voltage.

To provide an efficient grip which may be attached to a straight conductor is exceedingly difficult where it is desired to develop a high ultimate strength in the conductor without cutting the conductor. The use of hollow conductors or conductors of light cross section places the material at the outside where any flexure tends to increase the fiber stresses materially. The limit of pressure which may be applied to conductors of light section is a limiting factor in the gripping of the conductor. To produce a grip member which will maintain the grip even though the conductor may be reduced in cross section thru tension or combined tension and pressure, or by wear of the component parts is highly desirable as otherwise the conductor may become loose with time. In order to produce the desired result with as light a mass as possible in the clamp and in a clamping member in which the grip will automatically be increased even though the initial grip has been deficient is necessary where the best results are to be obtained. Snubbing clamps are very effective in producing an initial grip, and gripping heads embodying the snubbing feature may be incorporated with some forms of my improved clamp.

While deadend clamps reduce the amount of flexure on the cable, their use has not been extensive owing to the increased cost particularly when used at suspension or angle points. With my improved type of construction it is possible to deadend certain types of conductor with a relatively small and inexpensive clamp. The clamp although provided with resilient and self tightening features may be easily and cheaply made and can be made for a wide variety of conductors.

Figures 1, 2, 3, 4, 5, 6, 7, 8:
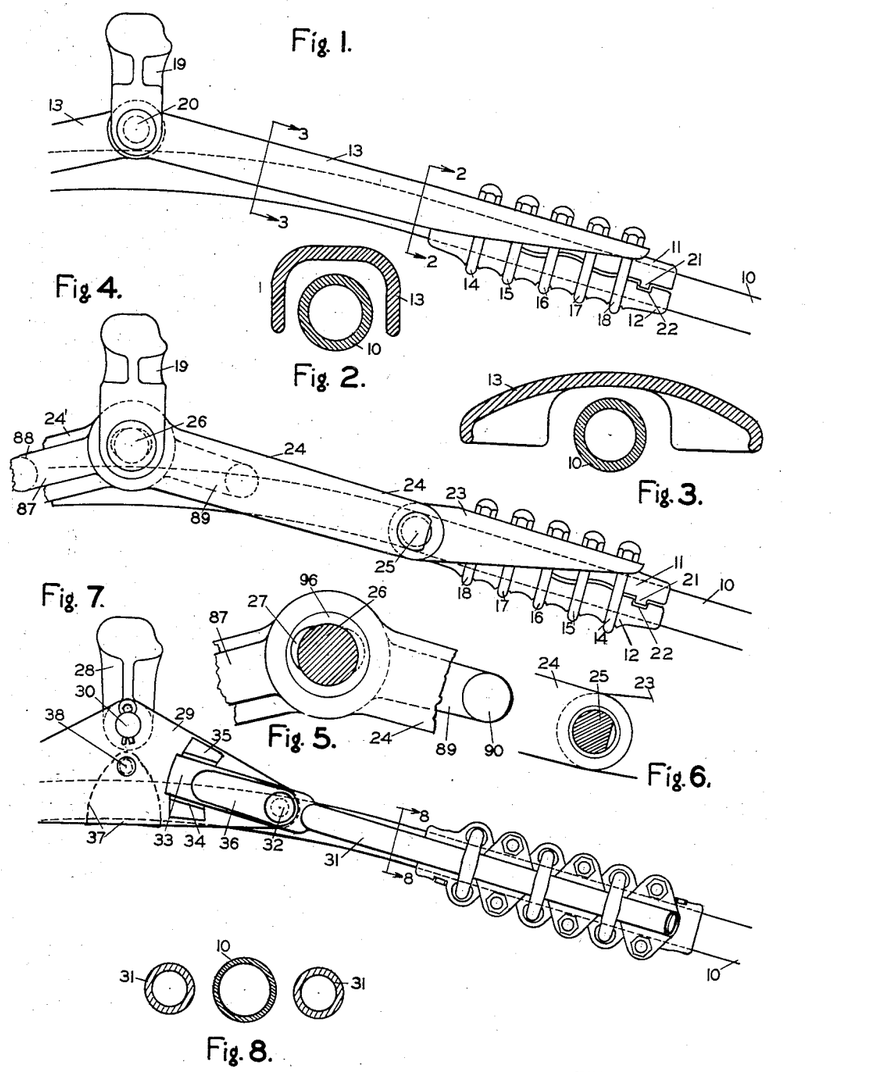
Fig. 1 is a side elevation of one form of the invention.
Fig. 2 is an enlarged section on line 2—2 of Fig. 1.
Fig. 3 is an enlarged section on line 3—3 of Fig. 1.
Fig. 4 is an elevation of another form of the invention.
Fig. 5 is an enlarged section through the attaching pin 26 of Fig. 4.
Fig. 6 is an enlarged section through the pin 25 of Fig. 4.
Fig. 7 is an elevation of another form of the invention.
Fig. 8 is an enlarged section on line 8—8 of Fig. 7.

In the form of the invention shown in Fig. 1 the conductor 10 is gripped by liner pieces or jaws 11 and 12. These pieces are attached to an arm 13 by means of U bolts 14, 15, 16, 17, and 18. The arm 13 is attached to a socket adapter 19 by means of coaxial pins or bosses 20, one at each side of the conductor 10. As will be seen from Figs. 2 and 3 the arm 13 is enlarged at line 3—3 so as to provide an effective electrostatic shield and produce a better distribution of stress in the insulator and reduce the tendency to discharge from the conductor and clamp. The arms 13 are readily made from pressed metal or castings, or by any other suitable means. The arm may be readily and cheaply made although of considerable length. In addition the arm may be so formed that it will provide an effective protection for the conductor from arcs following a discharge over the insulator string or to the supporting structure. It is evident that the enlargement shown in Fig. 3 may be an integral part of the clamp arm or may be provided by a separate piece. When formed as an integral part of the arm there is no possibility of the enlargement becoming loose due to vibration.

The grip heads being placed at some considerable distance from the conductor permit of a long radius of curvature in the conductor. The least amount of bend in the conductor will result when the radius of curvature of the conductor is such that the arc formed by the portion of conductor between the grip heads is tangent to the axis of the incoming conductor. In order to provide a long radius of curvature it is necessary that the grip heads be placed at some distance at either side of the socket adapter 19, which attaches the clamp to the insulator string.

There is an important difference in the toggle gripping heads shown in the invention as compared to gripping heads used heretofore. The grip pieces or liners 11 and 12 are provided with a key 21 and a corresponding recess 22 which prevent longitudinal movement of one part with respect to the other although the two parts may move closer together in order that the conductor 10 may be gripped. It is evident that the nuts on the several U bolts can be tightened so as to hold the conductor. However, the grip has an automatic or self tightening feature which will be described later in the discussion.

It is evident that the conductor 10 can raise or lower the long arm 13, rotating them about the pins or bosses 20. For many conditions this form of clamp is sufficient to provide ample working range. However, other types or forms may be more suitable for some conditions.

In Fig. 4 the gripping head is similar to that shown in Fig. 1 except that a short channel shaped member 23 is used for the clamping plate thru which the U bolts pass. The bolts 14 to 18 are graded in length and in Fig. 1 the shortest bolt 18 was placed at the outer end of the clamp and the longest bolt 14 at the inner end. In Fig. 4 the longest bolt 14 is placed at the outer end and the shortest bolt 18 at the inner end. In Fig. 1 the bolt 18 forming the link or toggle action being shorter will move thru a greater angle than the bolt 14 when the member 12 slips with respect to the arm 13 as the longitudinal movement of all of the bolts will be the same. This will produce the maximum grip or tightening at the point where the conductor enters the clamp and provide more favorable conditions for the conductor between grip heads. In Fig. 4 the longer bolt being at the point of entry will tend to reduce the grip on the conductor at this point and provide more favorable conditions where the conductor enters the clamp. The form which would be most suitable depends upon the operating conditions such as the nature of the vibrations and relative movement of the conductor. It is evident that the grip members 11 and 12 simply may be reversed to reverse the point of greatest gripping action and that the length of the several bolts may be varied to produce any desired result.

The arrangement shown in Fig. 4 permits of movement between the head and the arm 24, the pins or bosses 25 permitting of movement between the member 23 and the member 24.

The arm 24 is attached by pins or bosses 26 to the socket adapter 19 which in turn attaches to the insulator string or support. Any movement of the arm 24 will cause rotation about the pin 26. This movement may be used to dissipate energy and thereby dampen out vibrations or oscillations which cause the arm to move with respect to the socket adapter 19 or pin 26.

In the case of dancing conductors there usually is some longitudinal movement of the conductor with respect to the insulator support. A movement of this kind will cause rotation between the pin 26 and the bearing faces of the arms 24. Due to the pressure between the surface and the diameter, the dissipation of energy may be appreciable particularly where the movement is large or frequent. In the ordinary construction appreciable clearance is provided between pins or rivets, or bosses and the links attached to same. This permits a rocking action so that there may be little or no dissipation of energy even though the angular movement is appreciable.

In Fig. 4 the boss or pin 26 is made of relatively large diameter. In addition the hole in the arm 24 is elongated so that a space 27 is provided. This insures definite pressure at two points on the pin so that any angular movement will require slipping and the dissipation of energy. It is evident that the dissipation of energy will depend upon well known laws and will increase with the pressure and relative movement of the parts. The pressure can be materially increased by changing the effective angle of the component forces between arm and pin. The forces between arm and pin may be materially increased by changing the relative shape of the eye and pin as shown or by the use of notched or V grooves for the bearing surface. The movement may be increased for a given angle by increasing the effective radius of the bearing surfaces. Since the leverage at the pin 26 is much greater than at the pin 25, the torsional moment due to friction can be increased at this point as compared to the hinge point between the grip head 23 and arm 24.

In Fig. 6 a slightly different method is used to insure slippage between the arm 24 and the pin 25. In this case the pin 25 is flattened on one side, which will prevent a rocking movement as previously explained. The construction shown permits of considerable movement and wear without seriously interfering with the absorption of energy due to movement between the parts. It is evident that the friction should not be so great between the parts that movement will be prevented. However, by controlling the force and the effective radius it is possible to vary the friction very easily within very wide limits. The frictional surfaces may be made quite large so as to provide for wear, or the wearing surface provided with liners as shown in my prior Patents 2,062,283 dated December 1, 1936, and 2,086,150 dated July 6, 1937.

Figures 10, 11:
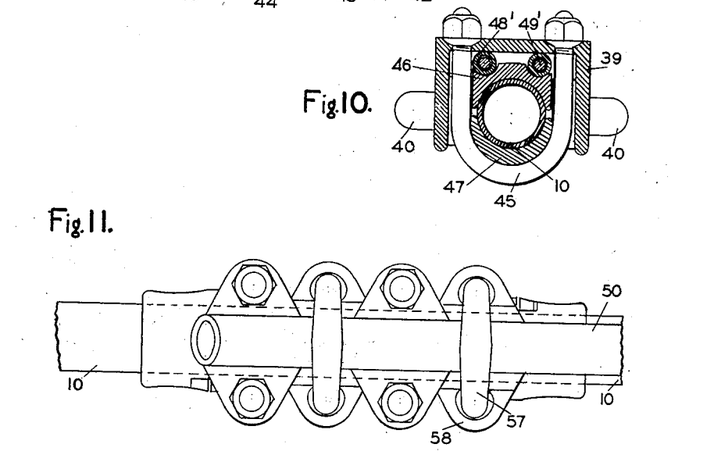
Fig. 10 is a section on line 10—10 of Fig. 9.
Fig. 11 is a side elevation of another form of gripping head.
Figures 12, 13:
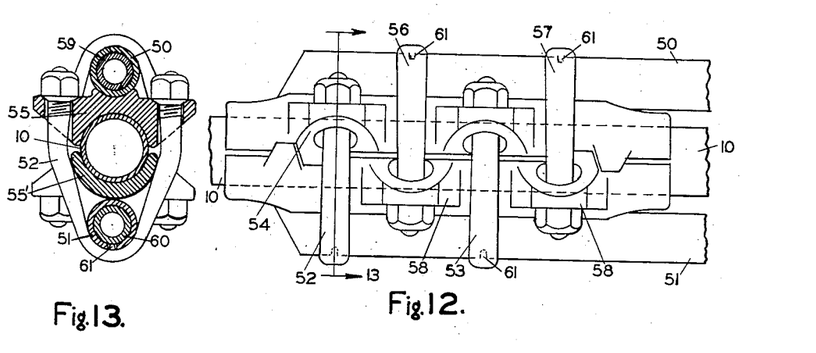
Fig. 12 is a plan of the gripping head shown in Fig. 11.
Fig. 13 is a section on line 13—13 of Fig. 12.

Fig. 7 shows another form of the invention in which the socket adapter 28 is attached to a yoke 29 by means of a pin 30. The single arm of Figs. 1 and 4 is replaced by two arms 31, one at each side of the conductor as shown in Fig. 8. A detail of the grip head is shown in Figs. 11, 12 and 13 and will be explained later. The arms 31 are attached to opposite side plates respectively of the yoke by pins 32. Each arm is provided with an extension 33 having a friction shoe 34 which bears upon a friction plate 35. The members 34 and 35 are replaceable and prevent wearing on the main parts of the clamp due to movement. The extension 33 produces pressure upon the shoe 34 so that energy will be dissipated due to any movement between the shoe 34 and the plate 35. This pressure is controlled or increased by a suitable spring member 36 which presses upon the extension 33. The length of the arm from the pin 32 to the inner end of the grip head with respect to the distance between the pin 32 and the center line of the clamp has a very important bearing upon the operation of the clamp. With the arrangement of parts shown in Fig. 7 the angle of sag for the conductor may change materially without causing any appreciable movement of the conductor at the mid-point between the two grip heads. This is particularly true where the two grip heads rise and fall at the same time. It is evident with the several arrangements that either arm may move independently of the arm on the other side of the clamp. In the case of the ordinary single seat clamps an upward or downward movement on one side of the clamp produces a reverse movement on the other side of the clamp. This frequently results in serious reflections and possible damage to the conductor.

Where the arrangement of parts is such that little or no movement will result at the center point of the conductor, the conductor may be readily steadied at this point by a seat or clamp member 37 which is attached to the yoke by a pin 38 or any other suitable means. It is evident that the seat may be a part of the yoke in some cases. The object of the seat is to steady the conductor and prevent movement or rubbing due to any twist which would cause the conductor to bear at some point against the clamp members. A steadying of the conductor will tend to prevent the vibration of the conductor between heads particularly where conditions might produce a natural period for this portion of the conductor.

The arrangement of the arms 31 shown in Fig. 8 tends to shield the conductor and also improve the gradient for the insulator string. Owing to the mutual effect of the several parts upon each other, a smaller member may be used without producing corona or discharge under the operating voltage.

Since the radius of curvature for the conductor between grip heads is such that the arc will be tangent to the axis of the conductor in the grip heads, it is evident that the tension in the conductor must be reduced for this portion. This requires that practically all of the tension in the conductor be taken up by the grip heads. The design and efficiency of the grip heads is therefore of considerable importance particularly where light weight, low cost and reliability are required. Power conductors generally consist in all or part of non-ferrous metals such as copper or aluminum. These metals have a relatively low yield point compared to steel. Owing to this relatively low yield point the conductors may be reduced in size or diameter from one or more causes. It is evident that where rigid grip members are provided any reduction in the diameter of the conductor may reduce the grip to such a point that the conductor will slide thru. A high working tension due to sleet, wind or low temperature may reduce the diameter of the conductor appreciably so that unless an automatic takeup is provided the conductor will slip thru the grip head. Vibration or high concentrated pressure between the strands may also reduce the effective diameter and the grip.

In rigid clamps it is well known that even clamps of very considerable length and with a large number of grip bolts will not necessarily hold the conductor. The conductor reduces in diameter at the point of entry, relieving the stress at this point. The maximum pressure and grip is then transferred to the next bolt which causes a reduction of the conductor at this point, and so on until the conductor slides thru. Any longitudinal tension in the conductor tends to produce a radial contraction due to one of the well known laws. In addition the lay of the conductor tends to produce a reduction in diameter. It is therefore evident that the design of grip head is very important where high tensions are involved together with small size in the clamp. By providing a grip head which has resiliency it is possible to counteract at least a portion of the effect of a reduction in diameter of the conductor upon the grip or holding power of the clamp.

Figure 9:
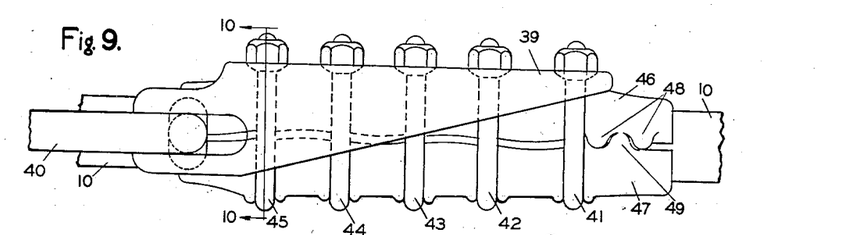
Fig. 9 is a side elevation of one form of gripping head.

In Fig. 9 the draw arm or plate 39 is attached to rods 40 which transfer the tension to the socket adapter or yoke. The bolts 41, 42, 43, 44, and 45 clamp the several parts together. The liners or grip pieces 46 and 47 fit the conductor closely. Complementary interlocking projections 48 and 49 cause the liners 46 and 47 to move together in a longitudinal direction although allowing the parts to move freely toward each other so as to grip the conductor. The closed ends of the U bolts bear upon the member 47 and the nuts engage the draw or bearing plate 39. Pressure between the U shaped bearing plate 39 and the upper liner 46 is tranferred thru members 48'. These members 48' are resilient tubular members with a center or bearing piece 49'. It is evident that any contraction of the conductor will permit the part 46 to approach the member 47 to maintain the same pressure upon the conductor. However, where the parts are rigid the pressure between the plate 39 and the member 46 will be reduced. By providing considerable resiliency in the tubular or helical members 48', there may be an appreciable movement between the liner 46 and the bearing face of the plate 39 without a serious reduction in pressure. It is therefore seen that the incorporation of a resilient member makes it possible to retain an appreciable part of the grip even though the conductor reduces in diameter due to wear, heavy tension or other causes. In order to be effective the members 48' should have appreciable movement so that they will still exert pressure between the liners and the conductor even though there is an appreciable reduction in diameter of the latter. This requires relatively thin members which might readily be crushed by too heavy a pressure during installation. To prevent damage from this source but still permit of suitable members, fillers 49' are used which act as bumpers and prevent collapse of the spring members 48'.

It is evident that where this resilient grip is developed slipping will be prevented even under very severe conditions. This permits of a very material reduction in the size and mass of the grip heads. This is a very material advantage in reducing the cost of the clamp and in preventing a hard spot which may seriously damage or shorten the life of the conductor.

In addition to resiliency in the gripping mechanism, a further automatic tightening is provided by the toggle action. This tends to prevent slipping between conductor and grip pieces in case the clamp has not been properly tightened during installation or in case very abnormal conditions are encountered which would exceed the limits of grip or takeup provided for by the resilient members. The effect of the toggle action is seen by reference to Fig. 21. The longitudinal movement of the grip plate 39 of Fig. 9 with respect to the liners 46 and 47 will cause the bolts to move thru an angle with respect to an axis normal to the conductor. Since the length of the bolt or link is fixed, the liner 47 will be drawn closer to the plate 39. This will increase the pressure upon the conductor or take up any clearance provided by a reduction in the diameter of the conductor, the limits depending upon the relative coefficient of friction and the effective friction between the several parts of the clamp. This distinctive feature will be discussed in detail in connection with Figs. 21 to 26 inclusive.

Other forms providing resiliency may be used without departing from the fundamental scheme of the invention. Fig. 11 shows another form in which resiliency is provided by tubular tension rods or members 50 and 51. The U bolts 52 and 53 bear upon the resilient member 51 and pass thru ears 54 on grip member 55. The bolts 56 and 57 bear upon the resilient member 50 and pass thru ears 58. The relation of parts is shown more clearly in Fig. 13. The nuts on the bolts are provided with spherical bearing faces or with spherical washers which will permit longitudinal movement. Clearance is provided in the holes in the ears so that the bolts can move in a longitudinal direction so as to provide a toggle action. The resilient members 50 and 51 are reinforced by members 59 and 60. These reinforcing members may be of any suitable design and may be further reinforced by bumpers as in Fig. 10. The bolts 52, 53, 56 and 57 are provided with projections 61 which engage holes or recesses in the members 50 and 51. These projections prevent the closed end of the U bolts from slipping with respect to the members 50 and 51. If the members 50 and 51 move with respect to the liners 55 the bolts will move thru an angle, the toggle action drawing the parts together. The arrangement permits of a slipping between the members 50 and 51 and the liners 55 before slipping will take place between the conductor and the liners 55 as will be seen from the following. It is evident that if the bolts are in normal position and the friction between the nuts and the ears neglected, the only force tending to prevent movement between the tension rods or members 50 and 51 and the liners 55 and 55' will be that due to the pressure between the members and the liner pieces. However, since the bolts bear against liners on the opposite side of the conductor, a tension of 1,000# in the two sides of a U bolt will produce 1,000# pressure between the tension rod 51 and liner 55'. However, this same tension in the U bolt causes the liner 55 to exert a radial pressure of 1,000# on the side of the conductor adjacent to the liner 55. This pressure is transferred thru the conductor to the liner 55'. It is therefore seen that a radial pressure of 1,000# between the rod 51 and the liner 55' produces radial pressure of twice this amount upon the conductor. If the coefficients of friction are the same in each case it will be seen that this arrangement of parts permits the tension rods 50 and 51 to slide upon the liners 55 and 55' before the conductor will slip in the liners. The angular movement of the bolts produces tightening and will compensate for any lack of initial grip or reduction in the diameter of the conductor. The limits of this movement due to differences in coefficient of friction and for the different types of conductor will be discussed in connection with Figs. 21 to 24 inclusive.

The resiliency in the grip members and a toggle construction which makes it possible to tighten the liners without the slipping between conductor and liner is the important feature of the grip heads and makes it possible to provide material improvements in suspension and deadend clamps.

Figure 14:
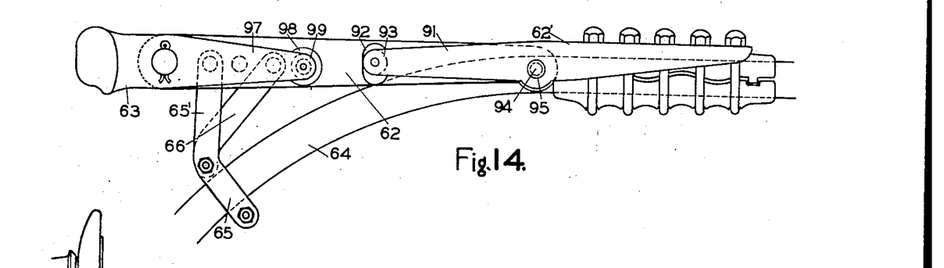
Fig. 14 is a side elevation showing one form of gripping head and arm used for deadending.

In Fig. 14 the improved type of grip head is applied to a deadend clamp. The arm and grip head may be similar to that shown in Figs. 1 or 4. The arm 62 is channel shaped in section and is readily made from pressed metal or by casting. The portion 62' to which the head is attached may be hinged as in Fig. 4 or may be a part of the main arm as in Fig. 1. The U shaped section provides a light arm even though there is considerable distance between the grip head and the socket adapter 63. The inner end of the conductor or jumper 64 is steadied by a clamp 65 attached to the arm by braces or arms 65' and 66. Holes are provided in the arm so that the steady arm 65' and 66 may be located so as to change the radius of bend in the jumper 64. The improved type of grip heads makes it possible to grip the conductor using a very light head and long arm, the resilient grip heads doing the work of the much larger although very efficient snubbing types of clamp.

It is evident that any of the several forms of grip heads shown in the suspension clamps may be used for deadend work. Where there is no tension in the conductor between grip heads the conditions are the same insofar as the grip members are concerned in both suspension and deadend clamps.

Figure 15:
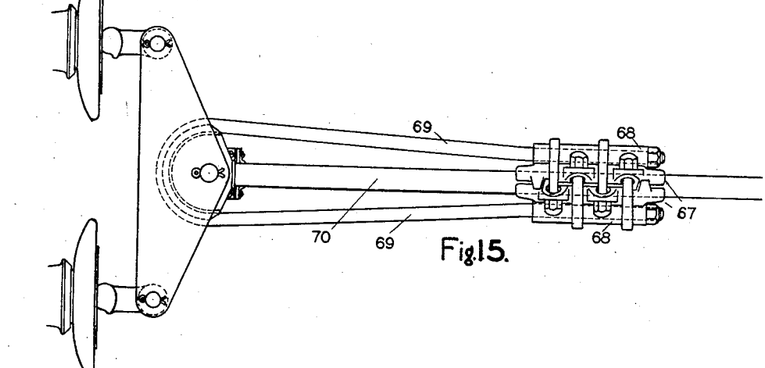
Fig. 15 is a plan showing another form of the invention used for deadending.
Figure 16:
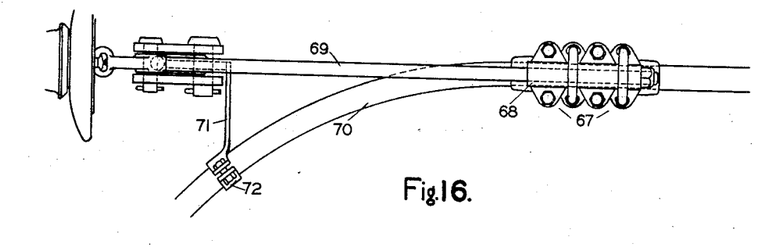
Fig. 16 is an elevation of Fig. 15.

Fig. 15 shows another adaptation of a grip head. In large hollow conductors there is likely to be an appreciable torsional moment particularly where single layer cables or conductors are used. In any conductor which is not twist free there is likely to be a tendency for the conductor to rotate and throw the jumper into the insulator or supporting structure. While this may not be possible under load due to friction on the parts, any reduction in the tension during construction may permit the shifting of the jumper which will require readjustment. One method of preventing rotation is to use multiple insulator strings with the yoke. This scheme limits rotation and does not depend upon the friction of the parts. The grip head 67 is provided with resilient tubular members 68. Tension rods 69 pass thru the members 68. As these rods provide clearance, the members 68 provide resiliency and pickup. However, the rods serve as a bumper and permit undue flattening of the member 68 due to excessive tightening or pressure from the U bolts. Some slight movement is possible between the rod 69 and the resilient member 68 if sufficient clearance is provided.

The separation of the two sides of the tension rod 69 tends to limit the torsional movement due to an untwisting of the conductor. The jumper 70 is held by an arm 71 and clamp 72.

Figures 17, 18:
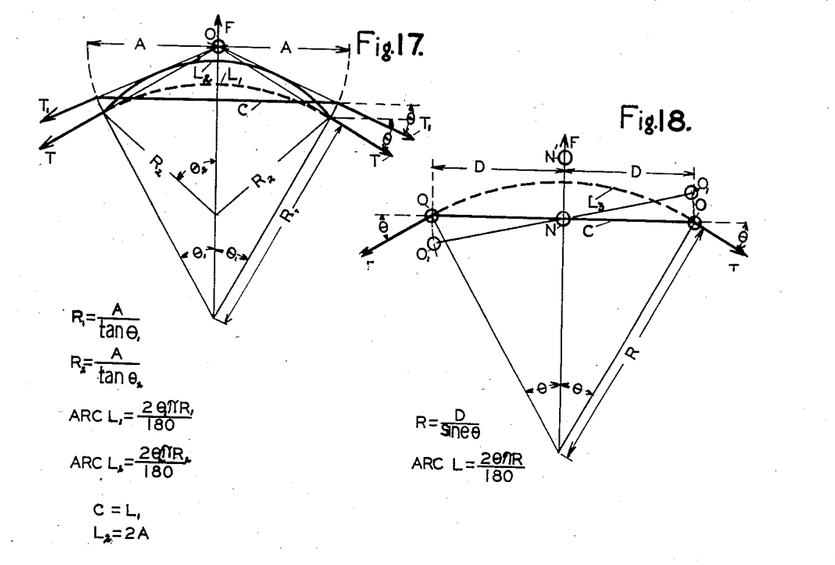
Fig. 17 is a diagram.
Fig. 18 is a diagram.
Figure 19:
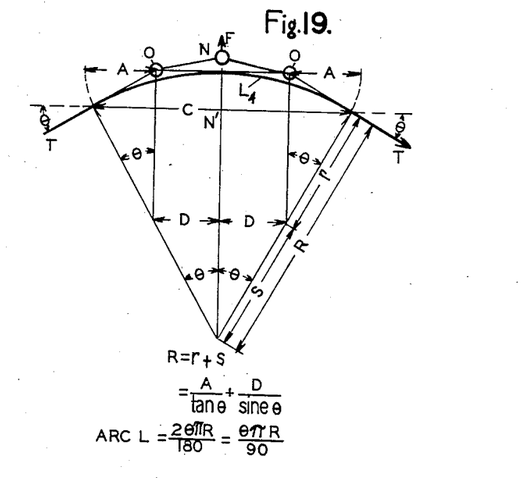
Fig. 19 is a diagram.

The general characteristics and advantages of the invention are shown by a comparison of Figs. 17, 18 and 19, which are diagrams showing the operation of different types of clamp construction. Fig. 17 is a diagram of a clamp having two arms hinged at "O". "A" is the length of arm between the hinge point and inner end of the grip head. $R_1$ is the radius of arc $L_1$ which is tangent to the axis of the incoming conductor for sag angle $\theta_1$. $L_2$ is length of arc equal to 2A. $R_2$ is the radius of an arc of length $L_2$ for sag angle $\theta_1$.

If the arms are in horizontal position corresponding to sag angle $\theta=0$ and are clamped to a straight conductor, the length of conductor between grip heads will be $2A=L_2$. This position would be closely approximated where the clamp is applied to a conductor having very small sag angle. If then the sag angle increases to $\theta_2$, the conductor between grip heads will take position $L_2$. This is due to the fact that the grip heads approach each other with an increase in the sag angle and while a uniform arc tangent to the axis of the incoming conductor will be longer for a given chord length due to the shorter radius of curvature, there will be an excess of length in the conductor so that it will take position $L_2$ instead of position $L_1$. The radius of curvature will be $R_2$ whereas an arc of maximum radius tangent to the axis of the incoming conductors would have a much larger radius $R_1$. It is therefore seen that this type of construction reduces the radius of curvature for an increase in the sag angle over that possible for an arc which is just tangent to the axis of the incoming conductors.

It is evident that the point "O" might be raised above the conductor in attaching. However, this is very difficult where there is tension in the conductor, and unless the grip heads are hinged to the arms a serious bend may be thrown into the conductor by the clamping operation. It is therefore seen that the method is generally objectionable where there is to be a material increase in the sag angle after installation.

The hinge grip heads similar to those shown in Fig. 4 facilitate the application of the clamp, making it possible to attach the grip heads so that the length of conductor between grip heads will be approximately that for operating conditions. However, it is impossible to obtain a wide working range for the sag angle without danger of causing unnecessary bending of the section of conductor between grip heads.

If the grip heads are tightened so that the tangent arc $L_1$ is obtained for sag angle $\theta_1$ and the conductor "T" moves to $T_1$ reducing the sag angle, the distance between the grip heads will be increased. When this increases so that the chord "C" equals the length of arc $L_1$, the further rise or movement in the arms will be arrested. It is therefore seen that a bend will be thrown in the conductor as the length of conductor between grip heads will not be sufficient to permit the forming of an arc tangent to the axis of the incoming conductor.

It naturally follows that the working range of a clamp having arms with a common center of rotation is best suited where the sag angles are very small or the change in sag angle is very slight. However, the placing of the grip heads at considerable distance from the center of rotation makes it possible to reduce reflections very materially as either arm can rise or fall without necessarily affecting the arm on the adjacent side of the clamp. It is seen that the vertical movement is limited to some extent as any vertical movement would tend to change the location of the center point of the conductor and might easily cause this portion to vibrate under some conditions.

In Fig. 18 a yoke is used and the grip heads are placed adjacent to the point of rotation. However, it is evident that this method although sometimes used is open to serious objection. If the grip heads are attached to a straight conductor and then the conductor is allowed to take position "T" with sag angle θ, the conductor between grip heads will be a chord "C". The preferred position for the axis of the conductor between grip heads would be that of a tangent arc $L_3$. It naturally follows that where the chord between grip heads and the length of conductor between grip heads are both fixed it will be impossible to obtain the most favorable condition for the conductor except for one given sag angle. Any change from this sag angle will cause unnecessary bending over that for an arc tangent to the axis of the incoming conductors.

This type of construction is also open to a serious objection for some types of vibrations or oscillations in the line. If the conductor tends to vibrate so that there is a tendency to rise or fall on each side of the clamp at the same time, the clamp will act as though it is not hinged. The clamp of Fig. 17 is not open to this objection within the limits discussed. This is evident by a consideration of Fig. 18. If the center of rotation "N" is taken on the same line as the trunnions on the grip heads "OO" and the point "O" then rises to $O_1$ on one side of the clamp, the point "O" will fall to $O_1$ on the other side of the clamp. In other words the movement is 180° out of phase for the two sides and the movement on one side of the clamp is not independent of the movement on the other side, which is a serious limitation for some conditions. It is readily seen that for some types of vibrations or oscillations the clamp will cause reflections and act as a single seat clamp although in some types of vibrations or oscillations the clamp may cause little reflection. If the point of attachment between the yoke or insulator support "N" is raised to the point $N_1$ the general condition may not be changed for some oscillations. However, any up or down movement will tend to cause a horizontal movement of the point $N_1$. This may have a tendency to wear the metal parts unnecessarily and will transfer vibrations to the insulators which may cause damage if very severe. By consideration of Fig. 18 it is readily seen that placing the center of rotation on the axis of the conductor does not necessarily provide for serious vibrations and may be of little benefit as the clamp may produce a so-called hard spot on the line causing unnecessary bending in the conductor between grip heads for changes in the sag angle and cause reflections due to vibration in the conductor.

Fig. 19 shows my improved type of construction which has many advantages over clamps heretofore in use. In this construction the attachment of the yoke to the insulator at "N" may be above or below the normal position of the conductor without seriously affecting the operation of the clamp. In Fig. 19 the point is above the point of attachment of the arms to the yoke at "OO". The length of arm between point of rotation and the grip head is "A", and the distance of the point of rotation from the center line of the yoke to the point of rotation "O" is "D". The equations shown in Fig. 19 are readily obtained, it being assumed that the arc $L_4$ is tangent to the axis of the incoming conductor "T" for sag angle θ. By using a suitable ratio between "A" and "D" it is possible to obtain very favorable conditions for the conductor between grip heads. While the arm "A" normally will be in line with the axis of the incoming conductor, it is evident that the horizontal distance or the length of chord "C" between grip heads will depend not only upon the sag angle θ but upon the length of arm "A" and the distance between points of rotation "OO" or 2D. Since the points of rotation 2D are fixed the change in distance between the inner ends of the grip heads will be affected by the change in sag angle and the length of the arms "A" only.

A consideration of Fig. 17 showed that the length of conductor was too great between grip heads to provide a tangent arc for an increase in sag angle. Consideration of Fig. 18 showed that additional length was required to provide a tangent arc. However, a proper combination of the two would permit one to offset the other. This is accomplished in my improved type of construction as shown in Fig. 19.

It is evident that as the sag angle increases, the maximum radius for a uniform arc between grip heads would be normal to the axis of the conductor "T". It is therefore possible to determine the length of a uniform tangent arc for any position of the conductor "T" with sag angle θ.

Figure 20:
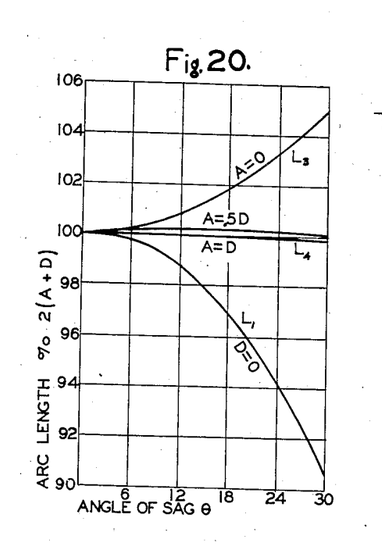
Fig. 20 is a graph.

By choosing a proper ratio of "A" to "D" it is possible to obtain greatly improved characteristics as will be seen by consideration of Fig. 20. It is evident that if a relation of "A" to "D" is obtained so that the arc $L_4$ tangent to the axis of the incoming conductor will be the same for all or any value of the sag angle θ in the working range, ideal conditions will be obtained. Therefore if the relation is such that the length of arc $L_4$ between grip heads is practically constant throughout a very appreciable change in the sag angle, it is evident that the maximum radius of curvature will be obtained for the conductor between grip heads. It is also evident that the arms and grip heads will be free to move over a wide range of sag angle without causing unnecessary bending in the conductor.

The length of the arc "L" compared to the distance between grip heads is $2(A+D)$. It will be seen that the length of arc is very close to that for a tangent arc over a wide range in sag angle even where the clamp is attached to a straight conductor. When the sag angle increases to 30° it is seen that the length of conductor between grip heads should be slightly less. By making the movable arm "A" less it is seen that a slightly greater length of conductor between grip heads would be required for a uniform arc which is tangent to the axis of the incoming conductors. However, it is seen that the length of an arc which will just be tangent would vary but little with the improved type of construction over that for the distance $2(A+D)$.

The material difference with this improved construction compared to other types is shown by reference to Fig. 20. The length of a tangent arc $L_1$ is shown for Fig. 17 where D equals 0. The length of a tangent arc for the so-called trunnion type of construction shown in Fig. 18 is shown by $L_3$ where A equals 0.

The construction shown in Fig. 19 has advantages other than providing for the maximum radius of curvature for a wide range in sag angle. It is seen that there is some latitude in the ratio of "A" to "D". Where A equals D the crest of the arc for various sag angles will change but little even though the range in sag angle is appreciable. This may be used to advantage in eliminating any tendency to cause the section of conductor between grip heads to whip and has the further advantage in that the conductor may be clamped or steadied at the middle point if desired. An application of this is shown in Fig. 7.

It is readily seen that the construction makes it possible to provide clamps which embody the working principles which may run from a few inches in length for small conductors to five or six feet in length for large conductors. The improved type of grip head makes it possible to reduce the mass materially so that the tendency to reflect vibrations or oscillations will be materially reduced.

It is evident that the improved type of construction would be of little benefit in eliminating possible damage from vibration if the grip heads or clamp at point of attachment to the conductor had considerable mass, therefore the construction of my improved type of grip head is of considerable importance as it is desired to take up the full tension in the conductor by means of the grip heads for most favorable conditions of operation although this is not essential for the performance of the clamp. In the past toggle types of construction have been used for gripping conductors but this method is not applicable to conductors where a slipping between the clamp and the conductor will cause damage. In the past the slipping of one part with respect to the complementary half has made it possible to grip the conductor but results in damage to same particularly where the tensions are high. In my improved type of construction this difficulty is eliminated and in addition resiliency is provided which greatly increases the latitude and effectiveness of the clamp.

Figure 21:
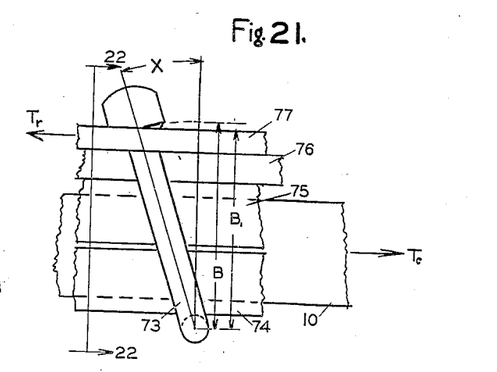
Fig. 21 is a fragmentary elevation showing the tightening due to the toggle action.

In this form of clamp shown in Fig. 21 a link or bolt 73 clamps liners 74 and 75. Resilient members 76 are placed between the draw plate or rod 77 and the liner 75. If the effective length of the clamping bolt or link is "B" in a plane normal to the axis of the conductor corresponding to toggle angle $X=0$ and the bolt or link is then moved thru an angle "X", the effective distance tending to clamp the several parts together will be reduced to $B_1$ or $B_1 = B \cos X$. $B - B_1 =$ the amount of takeup or tightening for angle "X". However, in order to produce tightening it is necessary that the arm or rod 77 move with respect to the liner or clamping member 74. Tension on the conductor TC must be balanced by the tension in the rod or arm TR. In order to insure tightening it is essential that the arm or rod 77 slip before the conductor 10 slips in the liner or seat pieces 74 and 75. With my improved type of construction the ratio of effective slipping friction between conductor and grip pieces to that between parts producing the toggle action has been materially increased so that tightening may be insured even for very smooth conductors and smooth seat pieces in the clamp.

Figure 22:
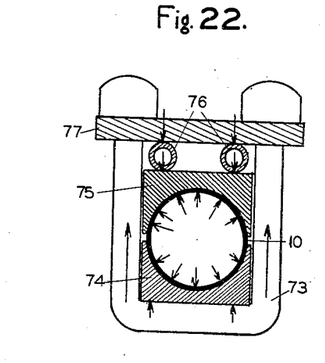
Fig. 22 is a section on line 22—22 of Fig. 21.

In Fig. 22 a hollow conductor is shown which may be made up of any form of segment or may consist of a tube. In this form of conductor there is a certain amount of flexibility in a radial direction particularly where the walls are light, therefore an inward movement at one point will cause an outward movement at some other point. This makes it possible to distribute the pressure very easily over the surface particularly where the clamping seats 74 and 75 fit the conductor closely. Where the parts fit closely the rigidity of the conductor may be neglected, and the pressure between the conductor and seat pieces will be in a radial direction. This produces a tangential force in the shell forming the conductor. For this condition a pressure produced by tension in the bolts may be readily resolved into a gripping friction.

If the pressure per unit length of arc of conductor in contact with the seat piece is "$p$", the total pressure between conductor and seat pieces will be $p \times \pi D$. The diametrical pressure which corresponds to the total pressure exerted by the bolts, however, will be $pD$ only. The bolt tension $B_t = pD$ where the bolts are in the plane normal to the axis of the conductor. For the angle "X" the pressure normal to the axis of the conductor will be $B_t \cos X$ and the total pressure on the conductor will be $\pi B_t \cos X$. The grip upon the conductor will depend upon the coefficient of friction, hence the grip equals $\Theta_c \times \pi B_t \cos X$. The friction between the arm or rod 77 and the resilient member 76 or between the resilient member 76 and the clamping liner 75 will depend upon the pressure and the coefficient of friction, or $\Theta_r B_t \cos X$. However, since the total force tending to prevent movement of the arm or plate includes not only that due to friction but a component due to the angle "X", the total force tending to prevent movement and further tightening will be $\Theta_r B_t \cos X + B_t \sin X$. As long as this component is less than the frictional grip upon the conductor, an increase in tension will cause an increase in the angle "X" and a further tightening. The critical angle beyond which point the conductor will slip is reached when $$\Theta_r B_t \cos X + B_t \sin X = \Theta_c \pi B_t \cos X$$

Simplifying $$\Theta_r + \frac{\sin X}{\cos X} = \Theta_c \pi \text{ or } \tan X = \Theta_c \pi - \Theta_r$$

The critical angle for various coefficients of friction are shown for several different values of $\Theta_r$. It will be seen that reducing the coefficient of friction of $\Theta_r$ will permit the use of a considerably larger toggle angle. In general $\Theta_r$ is equal to or slightly greater than $\Theta_c$. However, it is possible to use hard and smooth parts in the members between the clamping liner and the arm or rod 77 to control the slip.

Figure 25:
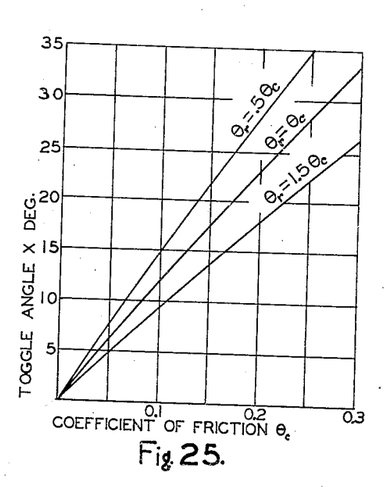
Fig. 25 is a graph.

Reference to Fig. 25 shows that a very large toggle angle may be used which will insure tightening even though there is an appreciable change in the dimensions of clamp or conductor. It is readily seen that using only one friction surface for the arm as against two friction members against the conductor together with the radial pressure provides a very effective margin so that tightening will take place due to the toggle action in case the clamp is not sufficiently tightened or in case of abnormal conditions.

Figure 23:
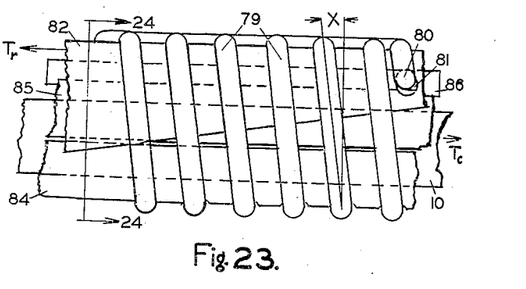
Fig. 23 is a side elevation of a grip head showing one means for producing grip or tightening.

Fig. 23 is similar in action to Fig. 21 with the exception that the tightening is produced by link 79. This link is formed by a wire or other suitable member in the general form of a spiral. One end is locked by passing an end 80 in a hole 81 in the arm or rod 82. The other end 83 is locked in a similar manner, the relation being shown in Fig. 24. This type of construction is similar in action to that where bolts or other links are used to produce the radial pressure and self tightening due to the toggle action. However, the construction eliminates projecting parts and nuts and may be readily applied to the conductor due to the fact that the spiral member 79 may be placed over the arm 82 and seat pieces 84 and 85 before the resilient members 86 are shoved into place. When the members 86 are shoved into place the link member 79 is brought into contact so that a very slight movement in the toggle angle "X" will cause an appreciable tightening.

Figure 24:
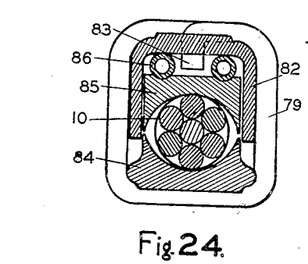
Fig. 24 is a section on line 24—24 of Fig. 23.

In Fig. 24 a rigid type of conductor is shown in which contact takes place at practically only one point. This is the general form where the radius of the seat pieces is larger than the radius of the conductor. It is evident that seat pieces may be provided with a V shaped seat or one in which the radius is smaller than that for the conductor which will increase the friction between the conductor, and the seat pieces. However, in the case of Fig. 24 the minimum amount of friction is assumed which would be that due to gripping a cylinder between two flat plates. The benefit of the radial pressure of Fig. 22 is lost with this type of construction, hence the toggle inside of which tightening will take place before permitting slipping of the conductor will be less. For this condition the grip upon the conductor will be $\theta_c 2P \cos X$. The pull on the rod or arm 82 will be $\theta_r P \cos X + P \sin X$. The critical angle will be $$\theta_r B_t \cos X + B_t \sin X = \theta_c 2 B_t \cos X$$

or $$\tan X = 2\theta_c - \theta_r$$

It is readily seen that for this condition the coefficient of friction $\theta_r$ between arm or parts permitting toggle action cannot exceed 2C or the coefficient of friction between conductor and clamp.

Figure 26:
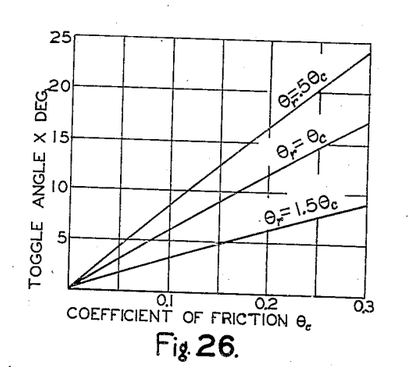
Fig. 26 is a graph.

The limits of toggle angle "X" for several values of $\theta_r$ and $\theta_c$ are shown in Fig. 26.

It has been found that while tangential friction prevents the full effect of the radial pressure of Fig. 22 at the start, this is closely approximated in practice. The extreme case would be reached in Fig. 24, the limits being shown in Fig. 26. It will be seen that the effective use of pressure on two sides of the conductor while producing friction upon one face only of the toggle system provides a margin so that tightening will result over an appreciable toggle angle. In addition this is accomplished without the slipping of either of the liner pieces upon the conductor.

Various forms of links and arrangements may be provided which will make use of the above principles. The resiliency in the grip mechanism tends to insure an effective grip upon the conductor so that a clamping friction which will develop a very high percentage of the ultimate can be readily obtained. In case of abnormal conditions the self tightening feature provided by the toggle action prevents slipping and damage of the conductor.

There is sufficient friction between parts so that once the clamp tightens it will not return to the original position. This is an advantage as it prevents movement which might cause serious wear due to changes in tension in the conductor from vibration or from changes in the sag.

The improved clamp with uniform arc and free moving arms with an improved type of resilient toggle head provides improved construction permitting of much more favorable conditions for the conductor.

It is evident that a number of different combinations of the elements disclosed may be used to advantage as occasion requires.

It is evident that dampening means may be added to any of the clamps. One simple and effective means is to allow the arms to extend past the point of support and allow same to rub against the adjacent arm. Such an arrangement is shown in Figs. 4 and 5. The arm 24 is provided with an extension 87 and a friction shoe 88 which bears upon the arm 24'. The arm 24' is equipped with an extension 89 which bears upon the inside of the arm 24. The arm 89 is equipped with a friction shoe 90 to provide for wear or control the amount of friction. Each side of the clamp may be equipped with these frictional dampeners, or they may be located on the outside of the arms only. Any convenient means may be used for providing for wear and regulating the amount of pressure and friction. When placed inside of the arm the extensions can be used for arresting the dropping of the arms following a release of tension in the conductor.

It is evident that practically any of the dampening schemes may be used with the several different forms of clamp. The arms with dampeners shown in Figs. 4, 5, 6, and 7 may be readily applied to the deadend or strain clamps as well as to the gripping heads shown in Figs. 9, 10, 11, and 12. The arm and gripping head of Fig. 4 may be readily applied to Fig. 14. In addition to the dampening provided by the frictional pin arrangement shown in Fig. 4 an arm 91 may be added in Fig. 14. This arm with its friction pad 92 and shoe 93 may be used to dampen out or limit the amplitude of vibrations. It is evident that the arrangement shown in Fig. 14 may be applied to Fig. 4 and to Figs. 1 and 7 with slight modification.

The wearing surfaces of the hinge point 94 are provided with bushings 95. These bushings provide for wear and also permit the use of very soft material such as copper or aluminum for parts of the clamp. The bushings are used to distribute the load, thereby permitting much lighter sections particularly where soft material such as aluminum is used. A bushing 96 may be used for the irregular shaped opening as in Fig. 5 so as to not only provide for wear but simplify the construction. By making the bushings and pins such that they can be renewed all wear in the main clamp members is prevented. It is evident that bushings may be applied at various points on the clamps. In some cases the bushing may be of a metal which will permit of two entirely different metals being used without causing trouble from corrosion, as for instance where a zinc or galvanized steel bushing may be used to separate aluminum and copper.

It is evident that in order to effect dampening a movement between the frictional surfaces is necessary. Frictional surfaces which do not have any relative movement will produce no dampening effect, therefore it is highly essential to locate these surfaces where there will be some movement particularly under vibrations or oscillations which would tend to damage the conductor or support. As several factors are involved which affect the vibrations or oscillations it may be necessary or advisable to use more than one dampening device in order to provide for all conditions. The mass of the various parts is likely to be a material factor in influencing the movement between various parts during vibrations or oscillations. This may apply equally well to any of the several modifications of the invention.

By reference to Fig. 14 it is evident that if there is rotation about the hinge point 94 the arm 91 with the friction pad 92 and shoe 93 can be used effectively as a dampening means as considerable movement and energy may be dissipated by properly proportioning the parts. If on the other hand the whole arm 62 and extension 91 move as a unit, the device will not effect any dampening. If the arm 62 rotates or moves with respect to the adapter 63 it is possible to produce an effective dampening action by equipping this adapter with an extension arm 97. This arm may be equipped with a friction pad 98 and the arm with a friction shoe 99. The arms 97 together with the friction pad and shoe permit the relative movement without interfering with the attachment of the bracket or brace arms 65' and 66.

I claim:

1. The combination with a conductor of a carrier for said conductor comprising a supporting member, separate links extending in opposite directions from said supporting member and having their adjacent ends pivoted to said member by coaxial pins or bosses, one at each side of the conductor and clamps carried by the outer ends of said links respectively for gripping said conductor at spaced points thereon said supporting member and links providing clearance for said conductor to move vertically past the pivotal axis of said links on said supporting member, said common axis being located substantially in line with the axis of the cable ends where they leave said clamps.

2. The combination with a conductor of a carrier for said conductor comprising a supporting member, separate links extending in opposite directions from said supporting member and having their adjacent ends pivoted to said member at a common axis and clamps pivoted to the outer ends of said links respectively and gripping said conductor at points thereon spaced apart a sufficient distance to permit the axis of the conductor to assume, under the tension thereon, a direction, at the point where it leaves said clamps, in alignment with said common axis.

3. The combination with a conductor of a carrier for said conductor comprising a supporting member, separate links extending in opposite directions from said supporting member and having their adjacent ends pivoted to said member at spaced pivot points thereon and clamps secured to the outer ends of said links respectively for gripping said conductor at spaced points thereon, said conductor being supported by said clamps, the distance between said spaced pivot points being greater than the length of one of said links from its pivotal support to the clamp thereon.

4. The combination with a conductor of a carrier for said conductor comprising a yoke, separate links extending in opposite directions from said yoke and having their adjacent ends pivoted to said yoke at spaced pivot points thereon, clamps secured to the outer ends of said links respectively for gripping said conductor at spaced points thereon and means for pivotally supporting said yoke on a pivotal axis between the pivotal connections of said yoke with said links, the length of one of said links between its pivotal support and the clamp carried thereby being between one-fourth and three-fourths the length of the distance between said spaced pivot points.

5. A carrier for a cable comprising a yoke, links pivoted to said yoke at spaced points thereon and clamp seats gripping said cable at spaced points thereon and fixed to said links respectively and spaced by said links beyond the respective pivotal connections between said links and said yoke, the inner ends of said clamp seats being spaced outwardly beyond the pivotal point of connection between said yoke and said links a distance not less than one-fourth or more than three-fourths of the distance between said spaced points to permit variation in the sag angle of said cable while maintaining the portion of said cable between said clamps in an arc of fixed length substantially tangent to the portions of the cable held by said clamps.

6. In a carrier for cables a pair of members, and a pivotal joint connecting said members and transmitting stress due to the load on said carrier said joint having bearing faces of relatively large diameter said faces being relieved for a portion thereof drawn toward each other by said stress to insure bearing at peripherally spaced portions of said surfaces and sliding movement of said bearing surfaces on each other for damping out vibrations of a supported cable.

7. A cable carrier comprising a link, a pivotal support for said link at one end thereof and means secured to the other end of said link for gripping a cable, said gripping means comprising contact members engaging opposite faces of said cable at fixed points thereon and radius members pivotally mounted on said link and engaging one of said contact members for drawing said contact members against said cable when said contact members are moved relative to said link in the direction of the axis of the cable.

8. In a cable carrier a support and a clamp carried by said support said clamp comprising contact members for engaging opposite faces of a cable said contact members being movable relative to each other radially of the cable but held from movement relative to each other axially of the cable and pivot links spanning said contact members and pivotally connected to said support for drawing said contact members together when moved by said cable relative to said support in the direction of the axis of the cable.

9. In a cable carrier a support, a pair of contact members engaging opposite portions of a cable to grip said cable and movable in the direction of the axis of said cable relative to said support, means for preventing said contact members from moving relative to each other in the direction of the axis of the cable, radius arms pivoted to said support and engaging one of said contact members for drawing said contact members together and toward said support when said contact members are moved in the direction of the axis of said cable and resilient means for regulating the force exerted by said radius arms.

10. A clamp for a cable comprising a support member disposed at one side of the cable, a contact member disposed at the opposite side of the cable, radius arms connecting said support and contact members for drawing said members toward each other when said cable and contact member are moved with respect to said support in the direction of the axis of the cable, and means interposed between said support and cable and movable with said cable to prevent sliding of said cable on said support.

11. A clamp for a cable comprising a support member disposed at one side of a cable, a contact member disposed at the opposite side of the cable, radius arms connecting said support and contact members for drawing said members toward each other to grip said cable when said cable and contact member are moved in the direction of the axis of the cable relative to said support, a second contact member interposed between said cable and said support, and held from movement relative to said first contact member in the direction of the axis of the cable, and resilient means interposed between second contact member and said support for regulating the pressure exerted by said radius members.

12. A cable clamp comprising a pair of contact members disposed at opposite sides of a cable, a support engaging one of said contact members and radius arms connecting said support with the other of said contact members, said radius arms being pivotally connected with said support and with said last named contact member to draw said last named contact member toward said support when it is moved relative to said support in the direction of the length of said cable, the friction between said cable and said contact members being greater than the friction between said support and the contact member engaged thereby to insure slipping between said support and contact member prior to slipping between said cable and said contact members.

13. A cable clamp comprising a pair of contact members engaging opposite sides of a cable, a support adjacent one of said contact members and radius arms connecting said support and the other of said contact members and distributed along said support longitudinally of said cable to draw said contact members together to grip said cable when said contact members are moved by said cable relative to said support, said radius arms being graded in length longitudinally of said cable to grade the stress on said cable.

14. A cable clamp comprising a pair of contact members disposed at opposite sides of a cable, spaced support members arranged at opposite sides of said cable adjacent said contact members respectively and radius arms connecting each of said support members with the contact member at the opposite side of the cable.

15. A clamp for a cable comprising a pair of contact members extending along a cable at opposite sides thereof, spaced supports arranged adjacent said contact members respectively and radius arms connecting each of said supports with the contact member at the opposite side of the cable therefrom, said supports being resilient to regulate the force exerted upon said contact members by said radius arms.

16. A cable carrier comprising a link, a pivotal support for said link at one end thereof, a contact member adjacent the other end of said link for engaging a cable, radius arms connecting said contact member with said link for drawing said contact member toward said link when said cable and contact member are moved longitudinally of said cable relative to said link, a second contact member interposed between said cable and said link and having greater frictional resistance to movement relative to said cable than to said link.

17. A cable clamp comprising a pair of contact members engaging opposite faces of a cable, a support engaging one of said contact members and a tension member wound about said support and contact members and forming radius arms for clamping said contact members against said cable when said contact members are moved by said cable relative to said support, said contact members having greater frictional resistance to movement relative to said cable than to said support.

18. A cable support comprising a pair of arms U-shaped in cross section, a pivotal support for adjacent ends of said arms and gripper heads secured to the outer ends of said arms respectively for holding a cable, said gripper heads being spaced from said pivotal support a sufficient distance so that for a given angle of sag in the cable, the radius of curvature of the portion of the cable between said heads when said portion is disposed in a uniform arc tangent to the cable where it is held by said heads, will not be less than the minimum radius of curvature permissible for the particular cable held by said support, the channel in said arms being adapted to receive said cable, the length of cable between said gripper heads being substantially twice the length of one of said arms from its pivotal support to its gripper head.

19. A cable support comprising a pair of arms, a pivotal support for adjacent ends of said arms and gripper heads carried at the outer ends of said arms and having gripping faces adapted to grip spaced portions of a cable and to support said cable at all positions thereof, said heads being pivoted to said arms to permit attachment of said heads at properly spaced positions on said cable notwithstanding the relative angular positions of the portions of the cable to which said heads are attached at the time of application to said cable, said heads being spaced apart on said cable a sufficient distance to permit said arms to receive substantially the entire tension on said cable and be drawn to a position in which the cable, where it leaves each gripper head, is in alignment with the pivotal support for the arm carrying said head.

20. A clamp for a conductor comprising a pair of contact members engaging opposite sides of the cable, a holding member engaging one of said contact members and radius arms cooperating with said contact members and holding means and actuated by tension on said cable for clamping said contact members to said cable, said contact members providing two friction surfaces pressed against said conductor by the pressure exerted by said radius arms as against one surface of said holding member engaging said holding members to insure slipping between said holding member and contact means to tighten said radius arms rather than between said contact members and holding member.

21. A conductor support comprising gripper heads for engaging a conductor at spaced positions thereon and means for controlling the position of the mid-portion of the conductor between said gripper heads when the angle of sag of said conductor varies, said means comprising a pair of arms having said gripper heads fixed to the outer ends thereof respectively said gripper heads having cable supporting portions, said arms extending inwardly from said gripper heads and a yoke to which the inner ends of said arms are pivoted at spaced points on said yoke, the inner ends of the cable supporting portions of said gripper heads being spaced outwardly from said pivot points respectively to permit said conductor to move relative to the inner portions of said arms, the distance between the pivot points on said yoke being approximately twice the spacing of the inner end of the cable supporting portion of each of said gripper heads from the pivotal support of its arm to permit the mid-portion of said conductor to remain approximately stationary during the pivotal movement of said arms.

22. A conductor support comprising a yoke, a pair of arms pivotally mounted at spaced points on said yoke and gripper heads having cable supporting portions fixed to said arms respectively for gripping a cable at fixed positions thereon the inner end of the supporting portion of each gripper head being spaced outwardly from the pivotal support of the arm to which said gripper head is attached, the spacing of said pivot points relative to each other and to said gripper heads being such that the portion of the conductor between said gripper heads will maintain a uniform arc tangent to the portions held by said gripper heads for various angles of sag, the movement of said heads toward and from each other compensating for the variation in the length of the chord of said arc.

23. A conductor support comprising a yoke, a pair of arms pivotally mounted at spaced points on said yoke and gripper heads fixed to said arms respectively at points spaced from their pivotal supports, the distance between the pivotal supports on said yoke being from one to two times the distance between the inner termination of the cable supporting portion of each gripper head and the pivotal support of its arm to maintain the portion of the conductor between said gripper heads in a substantially uniform arc, tangent to the portions of the conductor held by said gripper heads.

24. A conductor support comprising a yoke, a pair of arms pivotally mounted at spaced points on said yoke, and gripper heads fixed to said arms respectively for gripping a cable at spaced positions on said cable, the pivotal supports for said arms being spaced apart a distance from one to two times the spacing of each of said gripper heads from the pivotal support of its arm to maintain the portion of the conductor between said gripper heads in a substantially uniform arc tangent to the portions of the conductor held by said gripper heads for various sag angles, said gripper heads having resilient means for gripping said conductor.

25. A conductor carrier comprising a pair of arms, means for pivotally supporting the adjacent ends of said arms and resilient gripper heads carried at the outer end of said arms, said gripper heads comprising contact members, radius arms for clamping said contact members on the conductor, and resilient means for controlling the pressure between said contact members and conductor, the friction between the conductor and contact members being sufficiently great to insure tightening of said contact members on the conductor before slipping will take place between said contact members and said conductor.

26. A clamp for a cable comprising contact members, radius arms actuated by the tension in a conductor held by said clamp for pressing said contact members against said conductor and resilient means for transmitting the pressure from said radius arms to said contact members to insure initial friction between said contact members and conductor without the use of adjustable tightening means.

27. A clamp for a conductor comprising contact members for engaging opposite faces of the conductor, a holding member, radius arms for clamping said contact members against said conductor and said holding member and resilient means interposed between said holding member and said contact members for insuring initial frictional engagement between said contact members and said conductor and for maintaining resilient pressure on said conductor notwithstanding radial contraction of said conductor under tension thereon.

28. A support for a conductor comprising a pair of gripper heads for holding the conductor at spaced points thereon, pivotally mounted arms for supporting said gripper heads, one of said arms having a portion rigid therewith and extending past its pivotal mounting and frictional contact means between said extension and the other arm for damping out vibrations of a conductor held by said support.

29. A conductor support comprising a pair of links, means for pivotally supporting the adjacent ends of said links, clamps carried by the outer ends of said links respectively, said clamps comprising self-tightening means to compensate for deformation of a conductor held by said clamp due to tension thereon, said clamps being spaced from one another a sufficient distance on said conductor to permit substantially the entire tension on said conductor to be received by said clamps and links, leaving the portion of said conductor between said clamps free to assume an arc of maximum radius tangent to the axis of the conductor at said clamps.

30. The combination with a supporting member of a pair of links having their adjacent ends pivotally mounted on said supporting member, clamps carried by the outer ends of said links, each of said clamps comprising a holding member, a pair of seat members for engaging a conductor, and means cooperating with said holding member and seat members and actuated by the tension on a cable engaged by said seat members for pressing said seat members against said cable and one of said seat members against said holding member, and for exerting at least twice as much pressure between said seat members and cable as between said contact member and the seat member engaged thereby, said clamps being spaced from each other on said cable a distance substantially equal to the sum of the length of said links to permit the tension on said cable to be received by said links and leave the cable between said clamps free to assume an arc of maximum radius tangent to the axis of said cable in said clamps.

ARTHUR O. AUSTIN.